United States Patent
Chen et al.

(10) Patent No.: US 8,018,183 B2
(45) Date of Patent: Sep. 13, 2011

(54) MOTOR SPEED CONTROLLER

(75) Inventors: Shih-Chang Chen, Taipei Hsien (TW);
Shen-An Chen, Taipei Hsien (TW);
Rong-Cong Hung, Taipei Hsien (TW);
You-Ren Lin, Taipei Hsien (TW);
Rong-Hwang Horng, Taipei Hsien (TW); Yaw-Shen Lai, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 388 days.

(21) Appl. No.: 12/421,587

(22) Filed: Apr. 9, 2009

(65) Prior Publication Data

US 2010/0148713 A1    Jun. 17, 2010

(30) Foreign Application Priority Data

Dec. 16, 2008  (CN) .......................... 2008 1 0306294

(51) Int. Cl.
*H02P 5/00*  (2006.01)
(52) U.S. Cl. ........ 318/268; 318/607; 318/610; 318/632; 388/906
(58) Field of Classification Search .................. 318/268, 318/607–610; 388/906
See application file for complete search history.

(56) References Cited

U.S. PATENT DOCUMENTS

| 4,982,142 | A  | * | 1/1991  | Shu ................................ 318/268 |
| 5,790,971 | A  | * | 8/1998  | Hsieh .............................. 701/99 |
| 6,859,007 | B2 | * | 2/2005  | Toyozawa et al. ............ 318/632 |
| 7,417,389 | B2 | * | 8/2008  | Shaw ............................. 318/268 |
| 7,453,229 | B2 | * | 11/2008 | Lee et al. ...................... 318/632 |
| 7,498,760 | B2 | * | 3/2009  | Akiyama ....................... 318/632 |
| 7,619,378 | B2 | * | 11/2009 | Morinaga et al. ............. 318/139 |

* cited by examiner

*Primary Examiner* — Mark Budd
(74) *Attorney, Agent, or Firm* — Altis Law Group, Inc.

(57) ABSTRACT

A speed controller used in a control loop of a motor includes a comparator, a processing device, and an arithmetic logical unit (ALU). The comparator compares a received instruction speed or a received measured speed of the motor with a predetermined speed value, outputs a first signal to the processing device when the received speed is greater than the predetermined speed value, or outputs a second signal to the processing device when the received speed is equal to or less than the predetermined speed value. The processing device receives a speed difference between the instruction speed and the measured speed. The processing device outputs a first proportional value when the first signal is received, or outputs a second proportional value when the second signal is received. The ALU outputs an instruction current to the control loop by calculating the proportional value according to a predetermined calculation rule.

12 Claims, 6 Drawing Sheets

MOTOR SPEED CONTROLLER

BACKGROUND

1. Technical Field

The present disclosure relates to speed controllers, and more particularly to a speed controller used in a motor control loop.

2. Description of Related Art

In industrial motion systems, operating status of a motor is adjustable according to a speed of the motor. The speed of the motor is fed back to a control loop of the motor by a measurement device, such as a coder, with measurement errors sometimes occurring. The measurement errors can be amplified by being multiplied by a proportional gain value of the control loop of the motor. Current spike may be generated by the amplified measurement errors, especially when the motor is operated at a low speed. The current spike is transmitted to a power supply which adjusts the operating status of the motor. This will cause excessive motor vibration and noise, and can shorten the life of the motor.

DETAILED DESCRIPTION

Figure 1:
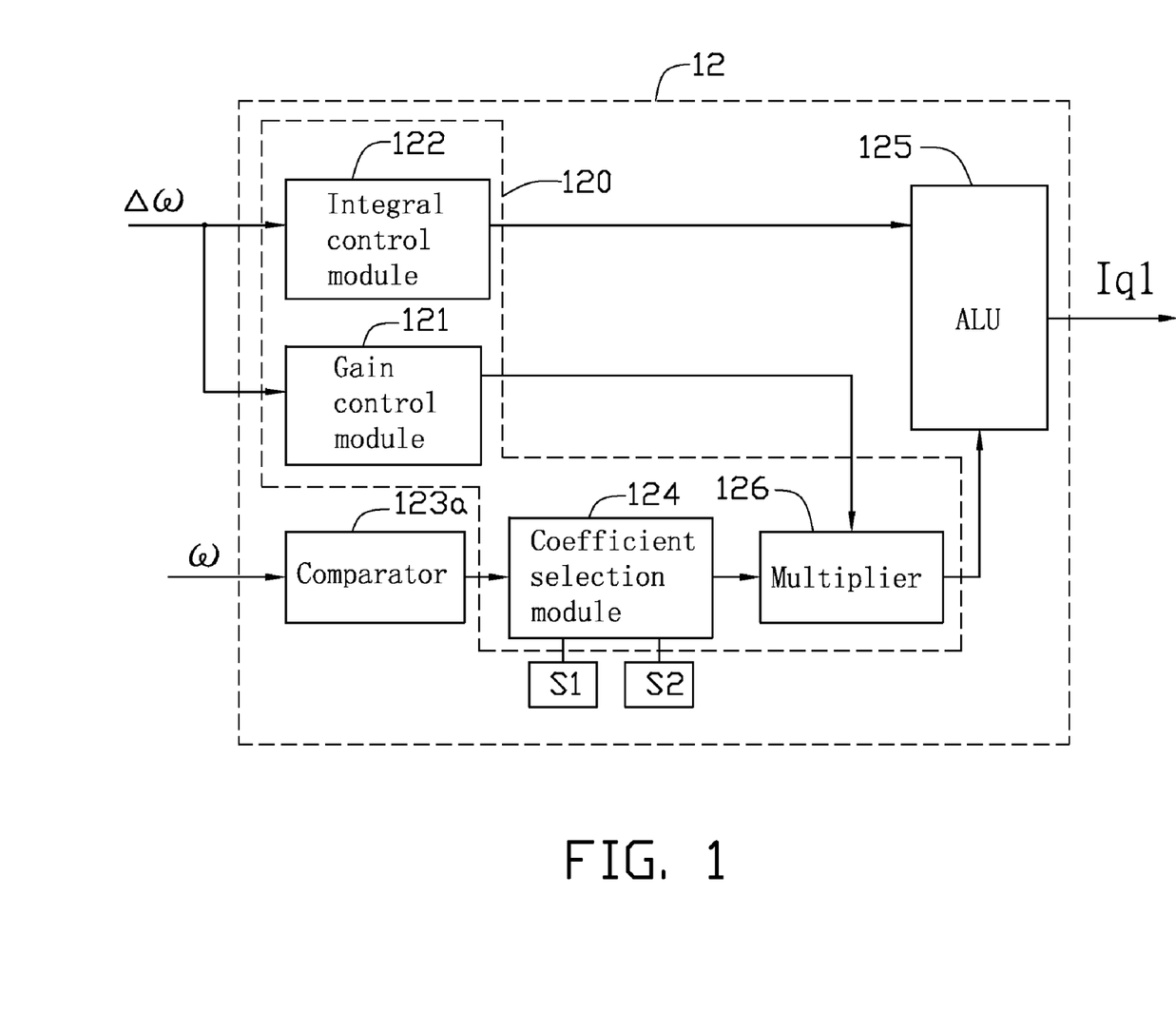
FIG. 1 is a block diagram of a first embodiment of a motor speed controller.

Referring to FIG. 1, a first embodiment of a motor speed controller 12 includes a processing device 120, a comparator 123a, and an arithmetic logical unit (ALU) 125. The processing device 120 includes a gain control module 121, an integral control module 122, a coefficient selection module 124, and a multiplier 126. Input to the gain control module 121 and the integral control module 122 is connected to function as a first input of the processing device 120, and also as a first input of the motor speed controller 12. An input of the comparator 123a functions as a second input of the motor speed controller 12. An output of the comparator 123a is connected to an input of the coefficient selection module 124. The input of the coefficient selection module 124 functions as a second input of the processing device 120. An output of the coefficient selection module 124 is connected to a first input of the multiplier 126. An output of the gain control module 121 is connected to a second input of the multiplier 126. An output of the multiplier 126, functioning as a first output of the processing device 120, is connected to a first input of the ALU 125. An output of the integral control module 122, functioning as a second output of the processing device 120, is connected to a second input of the ALU 125. An output of the ALU 125 functions as an output of the motor speed controller 12.

Figure 2:
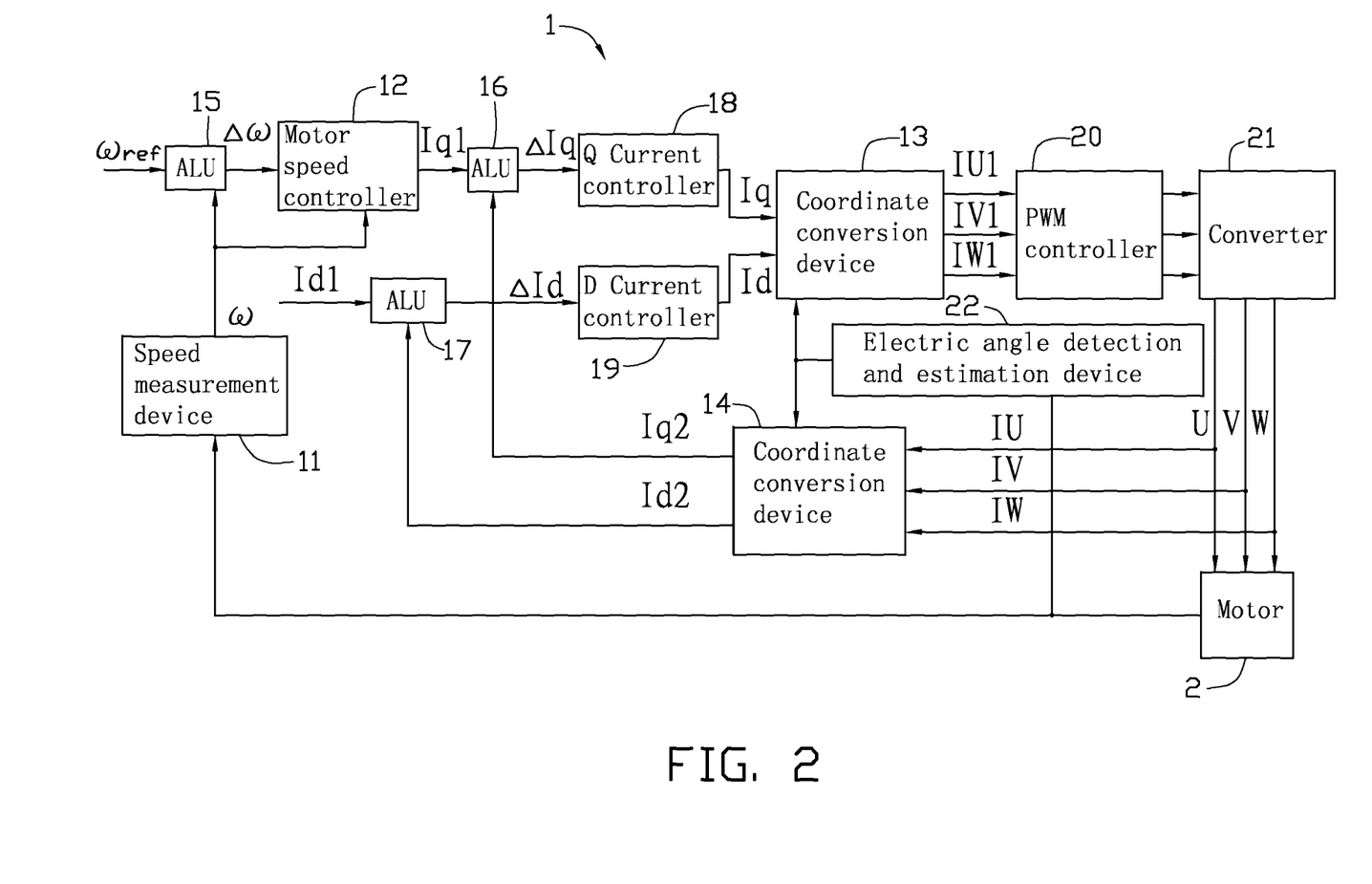
FIG. 2 is a block diagram of the motor speed controller of FIG. 1 connected in a control loop of a motor.

Referring to FIG. 2, the first embodiment of the motor speed controller 12 is deployed in a control loop 1. The control loop 1 includes a speed measurement device 11, two coordinate conversion devices 13 and 14, three ALUs 15, 16, and 17, two current controllers 18 and 19, a pulse-width modulation (PWM) controller 20, a converter 21, and an electric angle detection and estimation device 22. The control loop 1 controls operating status of a motor 2. The motor 2 is a three-phase input motor which includes three inputs U, V, and W. The inputs U, V, and W receive power from the converter 21.

The speed measurement device 11 is connected to an output of the motor 2 to measure a speed $\omega$ of the motor 2. The measured speed $\omega$ being received by a first input of the ALU 15 and the second input of the motor speed controller 12. The ALU 15 outputs a speed difference $\Delta\omega$ to the first input of the motor speed controller 12. The speed difference $\Delta\omega$ is obtained by subtracting the measured speed $\omega$ from an instruction speed $\omega_{ref}$ which being received by a second input of the ALU 15. The measured speed $\omega$ is compared with a first predetermined speed value by the comparator 123a. The comparator 123a outputs a first or a second signal to the coefficient selection module 124 according to the comparison result between the measured speed $\omega$ and the first predetermined speed value. The speed difference $\Delta\omega$ being received by the gain control module 121 and the integral control module 122. The gain control module 121 multiplies the speed difference $\Delta\omega$ by a first gain KP1, and transmits a product of the speed difference $\Delta\omega$ and the first gain KP1 to the multiplier 126. The integral control module 122 calculates an integral value of the speed difference $\Delta\omega$.

A first coefficient S1 and a second coefficient S2 are stored in the motor speed controller 12. The comparator 123a outputs the first signal in response to the measured speed $\omega$ exceeding the first predetermined speed value. The coefficient selection module 124 selects and transmits the first coefficient S1 to the multiplier 126 in response to the first signal being received from the comparator 123a. The multiplier 126 multiplies the first coefficient S1 by the product of the speed difference $\Delta\omega$ and the first gain KP1 to obtain a first proportional value. The comparator 123a outputs the second signal in response to the first predetermined speed value equaling or exceeding the measured speed $\omega$. The coefficient selection module 124 selects and transmits the second coefficient S2 to the multiplier 126 in response to the second signal being received from the comparator 123a. The multiplier 126 multiplies the second coefficient S2 by the product of the speed difference $\Delta\omega$ and the first gain KP1 to obtain a second proportional value. In this embodiment, the first coefficient S1 is equal to 1, and the second coefficient S2 is less than 1 but greater than 0. Accordingly, the second proportional value is less than the first proportional value. The ALU 125 is configured to receive the first or second proportional value from the multiplier 126, and receives the integral value from the integral control module 122. The ALU 125 calculates a q-axis instruction current Iq1 according to the received proportional value and the integral value. In this embodiment, the ALU 125 outputs the instruction current Iq1 to the ALU 16 of the control loop 1 by calculating the received proportional value and integral value according to a predetermined calculation rule.

The electric angle detection and estimation device 22 is connected to the output of the motor 2 to detect and estimate an electrical angle $\theta$ of the motor 2. The value of the electrical angle $\theta$ is output to the coordinate conversion devices 13 and 14 via the electric angle detection and estimation device 22. The coordinate conversion device 14 also receives an actual current with three phases of the motor 2 to perform a Direct to Quadrature (DQ) transformation. The actual current with three phases includes currents IU, IV, and IW which flow through the inputs U, V, and W of the motor 2 respectively.

The actual current with three phases is converted via the coordinate conversion device 14 into a current with two phases according to the received value of the angle θ. The current with two phases includes a q-axis actual current Iq2 and a d-axis actual current Id2. The ALU 16 receives the q-axis instruction current Iq1 and the q-axis actual current Iq2, to determine a q-axis current difference ΔIq by subtracting the q-axis actual current Iq2 from the q-axis instruction current Iq1. The current controller 18 receives the q-axis current difference ΔIq, and outputs a q-axis control current Iq according to the q-axis current difference ΔIq. The ALU 17 is configured to receive a d-axis instruction current Id1 and the d-axis actual current Id2, to determine a d-axis current difference ΔId by subtracting the d-axis actual current Id2 from the d-axis instruction current Id1. The current controller 19 receives the d-axis current difference ΔId, and outputs a d-axis control current Id according to the d-axis current difference ΔId. The d-axis control current Id and the q-axis control current Iq are received by the coordinate conversion device 13.

The coordinate conversion device 13 converts the d-axis control current Id and the q-axis control current Iq into a control current with three phases. The control current with three phases includes IU1, IV1, and IW1. The currents IU1, IV1, and IW1 are received by the PWM controller 20. The PWM controller 20 outputs a PWM signal to the inverter 21 according to the control current with three phases. The inverter 21 outputs the actual current with three phases (IU, IV, and IW) to the inputs I, V, and W of the motor 2 under the control of the received PWM signal. Parameters of the motor 2 are adjusted in response to the actual current with three phases being changed.

Figure 3:
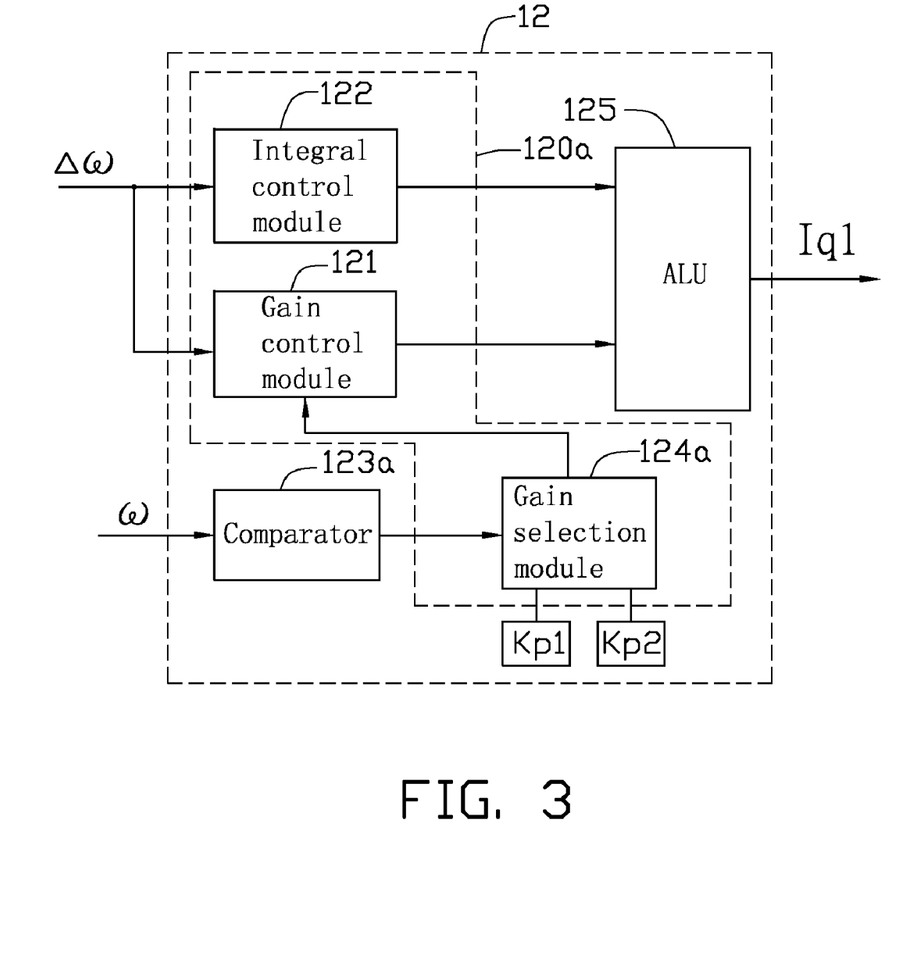
FIG. 3 is a block diagram of a second embodiment of a motor speed controller.

Referring to FIG. 3, a second embodiment of a motor speed controller 12 includes a processing device 120a, a comparator 123a similar to the comparator 123a of the first embodiment, and an ALU 125 similar to the ALU 125 of the first embodiment. The processing device 120a includes a gain control module 121, an integral control module 122, and a gain selection module 124a. Inputs of the gain control module 121 and the integral control module 122 are connected to function as a first input of the processing device 120a, and also as the first input of the motor speed controller 12. An input of the comparator 123a functions as a second input of the motor speed controller 12. An output of the comparator 123a is connected to an input of the gain selection module 124a. The input of the gain selection module 124a functions as a second input of the processing device 120a. An output of the gain selection module 124a is connected to the gain control module 121. An output of the gain control module 121, functioning as a first output of the processing device 120a, is connected to the first input of the ALU 125. An output of the integral control module 122, functioning as a second output of the processing device 120a, is connected to the second input of the ALU 125. The output of the ALU 125 functions as an output of the motor speed controller 12.

A first gain Kp1 and second gain Kp2 are stored in the second embodiment of the motor speed controller 12. The measured speed ω of the motor 2 being received by the comparator 123a in response to the second embodiment of the motor speed controller 12 being used in the control loop 1 to replace the first embodiment of the motor speed controller 12 of FIG. 2. The comparator 123a outputs a first signal in response to the measured speed ω exceeding a first predetermined speed value. The gain selection module 124a selects and transmits the first gain Kp1 to the gain control module 121 in response to the first signal being received from the comparator 123a. The gain control module 121 multiplies a speed difference Δω by the first gain KP1 to obtain a first proportional value. The comparator 123a outputs a second signal in response to the first predetermined speed value equaling or exceeding the measured speed ω. The gain selection module 124a selects and transmits the second gain Kp2 to the gain control module 121 in response to the second signal being received from the comparator 123a. The gain control module 121 multiplies the second gain Kp2 by the speed difference Δω to obtain a second proportional value. In this embodiment, the second gain Kp2 is less than the first gain Kp1. Therefore, the second proportional value is less than the first proportional value. The ALU 125 receives the first or second proportional value from the gain control module 121, and receives an integral value from the integral control module 122. The ALU 125 calculates a q-axis instruction current Iq1 according to the received proportional value and the integral value.

Figure 4:
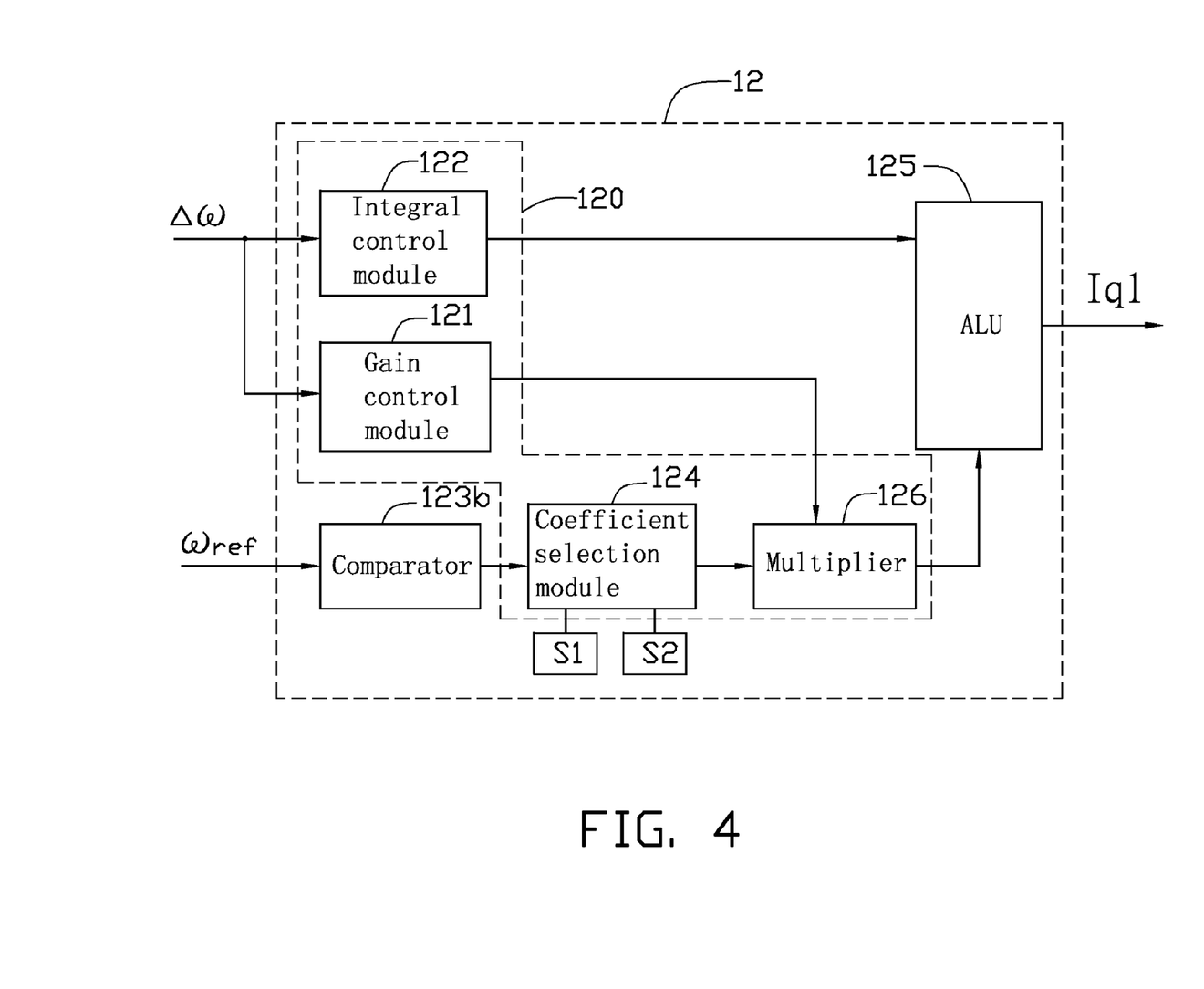
FIG. 4 is a block diagram of a third embodiment of a motor speed controller.

Referring to FIG. 4, a third embodiment of a motor speed controller 12 includes a processing device 120 similar to the processing device 120 of the first embodiment, a comparator 123b, and an ALU 125 similar to the ALU 125 of the first embodiment. An input of the comparator 123b functions as the second input of the motor speed controller 12. An output of the comparator 123b is connected to the second input of the processing device 120. The first output of the processing device 120 is connected to the first input of the ALU 125. The second output of the processing device 120 is connected to the second input of the ALU 125.

The comparator 123b receives the instruction speed $\omega_{ref}$ in response to the third embodiment of the motor speed controller 12 replacing the motor speed controller 12 in the control loop 1 of the first embodiment. The comparator 123b compares the instruction speed $\omega_{ref}$ with a second predetermined speed value, and outputs a first or a second signal to the coefficient selection module 124 according to the comparison result. The comparator 123b outputs the first signal in response to the instruction speed $\omega_{ref}$ exceeding the second predetermined speed value. The first coefficient S1 is selected to be transmitted to the multiplier 126 by the coefficient selection module 124 in response to the first signal being received from the comparator 123b. The multiplier 126 multiplies the first coefficient S1 by the product of the speed difference Δω and the first gain KP1 to obtain a first proportional value. The comparator 123b outputs the second signal in response to the instruction speed $\omega_{ref}$ being equal to or less than the second predetermined speed value. The second coefficient S2 is selected to be transmitted to the multiplier 126 by the coefficient selection module 124 in response to the second signal being received from the comparator 123b. The multiplier 126 multiplies the second coefficient S2 by the product of the speed difference Am and the first gain KP1 to obtain a second proportional value.

Figure 5:
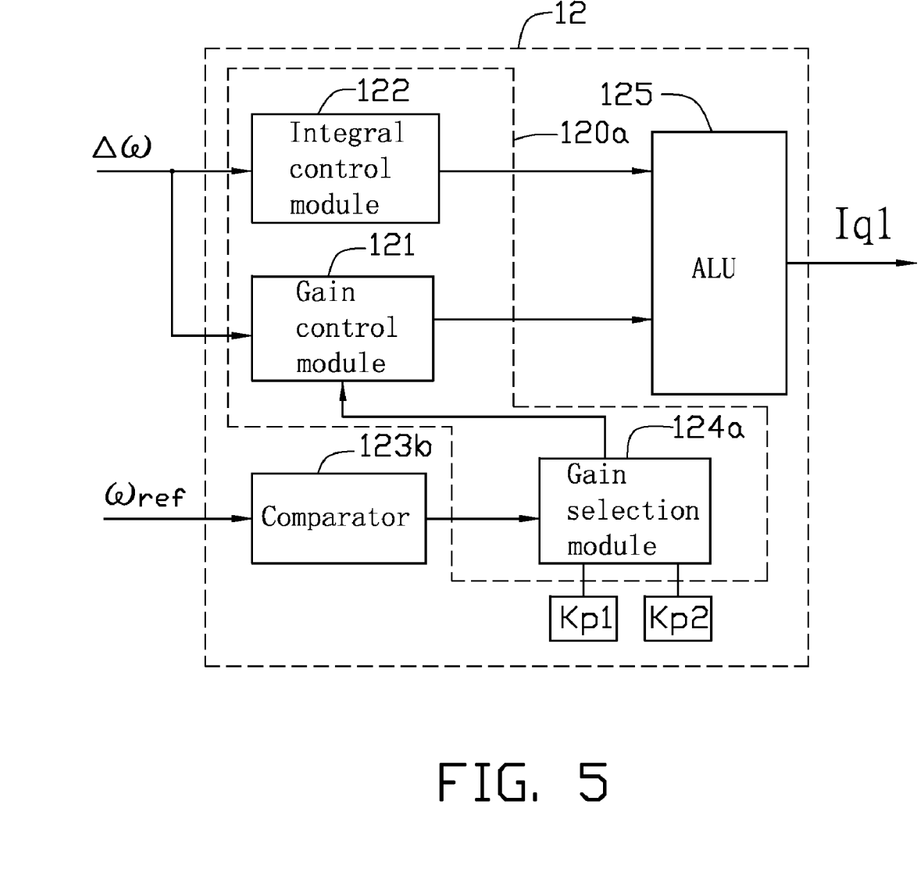
FIG. 5 is a block diagram of a fourth embodiment of a motor speed controller.

Referring to FIG. 5, a fourth embodiment of a motor speed controller 12 includes a processing device 120a similar to the processing device 120a of the second embodiment, a comparator 123b similar to the comparator 123b of the third embodiment, and a ALU 125 similar to the ALU 125 of the second embodiment. The input of the processing device 120a functions as the first input of the motor speed controller 12. The input of the comparator 123b functions as the second input of the motor speed controller 12. The output of the comparator 123b is connected to the second input of the processing device 120a. The first output of the processing device 120a is connected to the first input of the ALU 125. The second output of the processing device 120a is connected to the second input of the ALU 125. The output of the ALU 125 functions as the output of the motor speed controller 12.

The instruction speed $\omega_{ref}$ being received by the comparator 123b in response to the fourth embodiment of the motor speed controller 12 being used in the control loop 1. The comparator 123b outputs a first signal in response to the instruction speed $\omega_{ref}$ exceeding the second predetermined speed value. The first gain Kp1 is selected to be transmitted to the gain control module 121 by the gain selection module 124 in response to the first signal being received by the gain selection module 124. The gain control module 121 multiplies the speed difference $\Delta\omega$ by the first gain KP1 to obtain a first proportional value. The comparator 123b outputs a second signal in response to the second predetermined speed value equaling or exceeding the instruction speed $\omega_{ref}$. The gain selection module 124a selects and transmits the second gain Kp2 to the gain control module 121 in response to the second signal being received by the gain selection module 124a. The gain control module 121 multiplies the second gain Kp2 by the speed difference $\Delta\omega$ to obtain a second proportional value. The ALU 125 receives the first or second proportional value from the gain control module 121, and receives the integral value from the integral control module 122. The ALU 125 calculates a q-axis instruction current Iq1 according to the received proportional value and the integral value.

Figure 6:
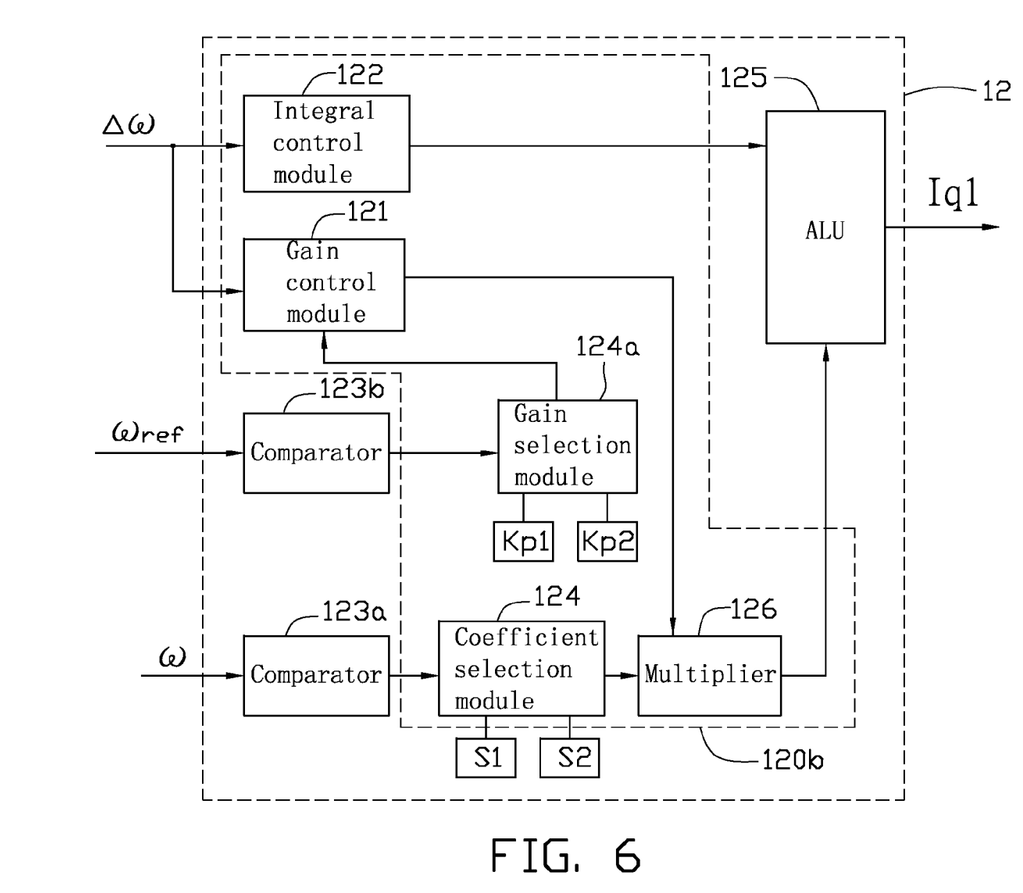
FIG. 6 is a block diagram of a fifth embodiment of a motor speed controller.

Referring to FIG. 6, a fifth embodiment of a motor speed controller 12 is used in the control loop 1. The fifth embodiment of the motor speed controller 12 includes a processing device 120b, two comparators 123a and 123b, and an ALU 125. The processing device 120b includes a gain control module 121, an integral control module 122, a coefficient selection module 124, a gain selection module 124a, and a multiplier 126. Inputs of the gain control module 121 and the integral control module 122 are connected to function as a first input of the processing device 120b, to receive the speed difference $\Delta\omega$. An input of the comparator 123a is connected to the speed measurement device 11 of FIG. 2 to receive the measured speed $\omega$ of the motor 2. An input of the comparator 123b is configured to receive the instruction speed $\omega_{ref}$. An output of the comparator 123a is connected to an input of the coefficient selection module 124. An output of the coefficient selection module 124 is connected to a first input of the multiplier 126. An output of the gain control module 121 is connected to a second input of the multiplier 126. An output of the comparator 123b is connected to an input of the gain selection module 124a. An output of the gain selection module 124a is connected to the gain control module 121. An output of the integral control module 122 is connected to a first input of the ALU 125. An output of the multiplier 126 is connected to a second input of the ALU 125. The input of the coefficient selection module 124 functions as a second input of the processing device 120b. The input of the gain selection module 124a functions as a third input of the processing device 120b. The output of the multiplier 126 functions as a first output of the processing device 120b. The output of the integral control module 122 functions as a second output of the processing device 120b.

The first gain Kp1, the second gain Kp2, the first coefficient S1, and the second coefficient S2 are stored in the fifth embodiment of the motor speed controller 12. The comparator 123b outputs a first signal in response to the instruction speed $\omega_{ref}$ exceeding the second predetermined speed value. The gain selection module 124a transmits the first gain Kp1 to the gain control module 121 in response to the first signal being received from the comparator 123b. The comparator 123b outputs a second signal in response to the instruction speed reef being less than the second predetermined speed value. The gain selection module 124a transmits the second gain Kp2 to the gain control module 121 in response to the second signal being received from the comparator 123b. The gain control module 121 multiplies the speed difference Am by the received first or second gain KP1 or Kp2. The multiplier 126 receives the product of the speed difference $\Delta\omega$ and the gain KP1 or Kp2.

The comparator 123a outputs a third signal in response to the measured speed w exceeding the first predetermined speed value. The coefficient selection module 124 transmits the first coefficient S1 to the multiplier 126 in response to the third signal being received from the comparator 123a. The comparator 123a outputs a fourth signal in response to the measured speed $\omega$ being equal to or less than the first predetermined speed value. The coefficient selection module 124 transmits the second coefficient S2 to the multiplier 126 in response to the fourth signal being received from the comparator 123a. The multiplier 126 multiplies the received coefficient by the product of the speed difference $\Delta\omega$ and the received gain to obtain a proportional value. The ALU 125 receives the proportional value from the gain control module 121, and receives an integral value of the speed difference $\Delta\omega$ from the integral control module 122. The ALU 125 calculates the q-axis instruction current Iq1 according to the received proportional value and the integration value.

In this embodiment, a first proportional value is obtained in response to the first gain Kp1 being received by the gain control module 121, and the first coefficient S1 being received by the multiplier 126. A second proportional value is obtained in response to selection of the first gain Kp1 and the second coefficient S2. A third proportional value is obtained in response to selection of the second gain Kp2 and the first coefficient S1. A fourth proportional value is obtained in response to selection of the second gain Kp2 and the second coefficient S2 are selected. Each of the second, third, and fourth proportional values is less than the first proportional value.

In one embodiment, each of the coefficient selection module 124 and the gain coefficient selection module 124a is a switch. The first and second predetermined speed values can be set to equal each other.

Therefore, the second coefficient S2 and the second gain Kp2 can be selected in response to the measured speed $\omega$ being less than the first predetermined value, or the instruction speed $\omega_{ref}$ being less than the second predetermined speed value. Therefore, a lesser proportional value than the first proportional value is output by the ALU 125 when the motor 2 is working at a low speed, in order to reduce noise and vibrations of the motor caused by a speed measurement error of the measure device 11. The lesser proportional value can be the second, third, or fourth proportional value, depends on the compared result of the measured speed $\omega$ and the first predetermined speed value, and the compared result of the instruction speed $\omega_{ref}$ and the second predetermined speed value.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A speed controller used in a control loop of a motor, comprising:
   a comparator comprising:
      an input configured to receive an instruction speed or a measured speed of the motor to compare with a predetermined speed value stored in the comparator; and
      an output configured to output a first signal in response to the received speed exceeding the predetermined speed value, and output a second signal in response to the received speed being less than the predetermined speed value;
   a processing device comprising:
      a first input configured to receive a speed difference between the instruction speed and the measured speed;
      a second input configured to receive the first signal or the second signal from the output of the comparator; and
      a first output configured to output a first proportional value in response to receiving the first signal, and output a second proportional value less than the first proportional value in response to receiving the second signal; and
   an arithmetic logical unit (ALU) comprising:
      a first input configured to receive the first proportional value or the second proportional value; and
      an output to output an instruction current to the control loop by calculating the received proportional value according to a predetermined calculation rule.

2. The speed controller of claim 1, wherein the processing device further comprises an integral control module comprising an input configured to receive the speed difference, and an output connected to a second input of the ALU and functioning as a second output of the processing device; an integration value of the speed difference is calculated by the integral control module, and being received by the second input of the ALU, the instruction current is calculated according to the integration value of the speed difference and one of the first proportional value and the second proportional value.

3. The speed controller of claim 2, wherein the processing device further comprises:
   a gain control module comprising an input connected to the input of the integral control module and functioning as the first input of the processing device;
   a coefficient selection module comprising an input functioning as the second input of the processing device; and
   a multiplier comprising a first input connected to an output of the coefficient selection module, a second input connected to an output of the gain control module, and an output functioning as the first output of the processing device.

4. The speed controller of claim 3, wherein the gain control module is configured to multiply the speed difference by a first gain, the product of the speed difference and the first gain being received by the multiplier, a first coefficient and a second coefficient are stored in the speed controller, the first coefficient is equal to 1, the second coefficient is less than 1, the coefficient selection module is configured to select and transmit the first coefficient to the multiplier in response to receiving the first signal from the comparator, and select and transmit the second coefficient to the multiplier in response to receiving the second signal from the comparator, the multiplier is configured to multiply the product of the speed difference and the first gain by the first coefficient to obtain the first proportional value, or multiply the product of the speed difference and the first gain by the second coefficient to obtain the second proportional value.

5. The speed controller of claim 3, wherein the coefficient selection module is a switch.

6. The speed controller of claim 2, wherein the processing device further comprises:
   a gain control module comprising an input connected to the input of the integral control module and functioning as the first input of the processing device, and an output connected to the first input of the ALU; and
   a gain selection module comprising an input functioning as the second input of the processing device, and an output connected to the gain control module.

7. The speed controller of claim 6, wherein a first gain and a second gain less than the first gain are stored in the speed controller, the gain selection module is configured to select and transmit the first gain to the gain control module in response to receiving the first signal from the comparator, and select and transmit the second gain to the gain control module in response to the second signal being received from the comparator, the gain control module is configured to multiply the speed difference by the first gain to obtain the first proportional value, or multiply the speed difference by the second gain to obtain the second proportional value.

8. The speed controller of claim 6, wherein the gain selection module is a switch.

9. A speed controller used in a control loop of a motor, comprising:
   a first comparator configured to comparing a measured speed of the motor with a first predetermined speed value, and output a first signal in response to the measured speed equaling or exceeding the first predetermined speed value, or output a second signal in response to the received speed being equal to or less than the predetermined speed value;
   a second comparator configured to comparing an instruction speed of the motor with a second predetermined speed value, and output a third signal in response to the instruction speed equaling or exceeding the second predetermined speed value, or output a fourth signal in response to the instruction speed being equal to or less than the second predetermined speed value;
   a processing device comprising:
      a first input configured to receive a speed difference between the instruction speed and the measured speed;
      a second input configured to receive the first signal or the second signal from the first comparator;
      a third input configured to receive the third signal or the fourth signal from the second comparator; and
      an output configured to output a first proportional value in response to receiving the first signal and the third signal, output a second proportional value in response to receiving the first signal and the fourth signal, output a third proportional value in response to receiving the second signal and the third signal, or output a fourth proportional value in response to receiving the second signal and the fourth signal, wherein each of the second, third, and fourth proportional values is less than the first proportional value; and
   an arithmetic logical unit (ALU) comprising:
      a first input configured to receive one of the first, second, third, and fourth proportional values; and an output configured to output an instruction current to the control loop by calculating the received proportional value according to a predetermined calculation rule.

10. The speed controller of claim 9, wherein the processing device comprises an integral control module comprising an input configured to receive the speed difference, and an output connected to a second input of the ALU; wherein an integral value of the speed difference is calculated by the integral control module, and received by the second input of the ALU, the instruction current calculated according to the integral value of the speed difference and one of the first, second, third, and fourth proportional values.

11. The speed controller of claim 10, wherein the processing device further comprises:
- a gain control module comprising an input connected to the input of the integral control module to receive the speed difference;
- a coefficient selection module comprising an input functioning as the second input of the processing device;
- a gain selection module comprising an input functioning as the third input of the processing device, and an output connected to the gain control module; and
- a multiplier comprising a first input connected to an output of the coefficient selection module, a second input connected to an output of the gain control module, and an output functioning as the output of the processing device.

12. The speed controller of claim 11, wherein a first gain equal to 1, a second gain less than 1, a first coefficient, and a second coefficient less than the first coefficient are stored in the speed controller, the gain selection module is configured to select and transmit the first gain to the gain control module in response to receiving the first signal, and select and transmit the second gain to the gain control module in response to receiving the second signal, the coefficient selection module is configured to select and transmit the first coefficient to the multiplier in response to receiving the third signal, and select and transmit the second coefficient to the multiplier in response to receiving the fourth signal, the gain control module is configured to multiply the speed difference by the selected gain, the multiplier is configured to multiply the product of the speed difference and the first gain by the first coefficient to obtain the first proportional value, multiply the product of the speed difference and the first gain by the second coefficient to obtain the second proportional value, multiply the product of the speed difference and the second gain by the first coefficient to obtain the third proportional value, or multiply the product of the speed difference and the second gain by the second coefficient to obtain the fourth proportional value.

* * * * *